United States Patent

Smith et al.

[11] Patent Number: 5,253,094
[45] Date of Patent: Oct. 12, 1993

[54] OPTICAL INTERCONNECTION NETWORK

[75] Inventors: David W. Smith, Woodbridge; Stephen A. Cassidy; Peter Healey, both of Ipswich, all of United Kingdom

[73] Assignee: British Telecommunications public limited company, London, England

[21] Appl. No.: 762,025

[22] PCT Filed: Feb. 5, 1990

[86] PCT No.: PCT/GB90/00169

§ 371 Date: Sep. 17, 1991

§ 102(e) Date: Sep. 17, 1991

[87] PCT Pub. No.: WO90/09708

PCT Pub. Date: Aug. 23, 1990

[30] Foreign Application Priority Data

Feb. 8, 1989 [GB] United Kingdom ............... 8902745

[51] Int. Cl.5 ............... H04J 14/02; H04B 10/12; G02B 6/28
[52] U.S. Cl. ............... 359/124; 359/115; 359/173; 385/24; 385/92
[58] Field of Search ............... 359/115, 116, 118, 120, 359/121, 124, 126, 136, 154, 164, 165, 173, 174, 176, 177, 163, 127; 385/24, 30, 146, 14, 50, 42

[56] References Cited

U.S. PATENT DOCUMENTS

| | | | |
|---|---|---|---|
| 3,986,020 | 10/1976 | Kogelnik | 359/119 |
| 4,234,970 | 11/1980 | Beasley et al. | 359/176 |
| 4,444,460 | 5/1984 | Stowe | 385/30 |
| 4,451,916 | 3/1984 | Casper et al. | 359/118 |
| 4,699,449 | 10/1987 | Lam et al. | 385/14 |
| 4,701,909 | 10/1987 | Kavehrad et al. | 359/121 |
| 4,742,576 | 2/1988 | McMahon | 359/126 |
| 4,871,224 | 10/1989 | Karstensen et al. | 385/14 |
| 4,873,681 | 10/1989 | Arthurs et al. | 359/121 |
| 4,883,743 | 11/1989 | Booth et al. | 385/50 |

Primary Examiner—Richard E. Chilcot, Jr.
Assistant Examiner—Rafael Bacares
Attorney, Agent, or Firm—Nixon & Vanderhye

[57] ABSTRACT

An optical interconnection network includes an optical bus formed by a D-fibre embedded in a thermoplastic substrate with the flat of the D-fibre flush with the top surface of the substrate. A module similarly constructed is dimensioned to be a push fit in a wall structure formed on the substrate with the fibres and in a position to evanescently couple optical signals from one fibre to the other.

22 Claims, 4 Drawing Sheets

OPTICAL INTERCONNECTION NETWORK

BACKGROUND OF THE INVENTION

1. Field of the Invention

This invention relates to optical interconnection networks (for optically interconnecting one or more transmitter stations with one or more receiver stations).

2. Related Art

Photonics technology could play a significant role in future telecommunications and computer switching systems within which areas there will then be a requirement for large non-blocking interconnect systems, for example, which each of say 10,000 transmitters will need to be independently connectable to any one of 10,000 receivers. Such large systems are not presently commercially achievable by known optical switching systems. Further, small systems which can be achieved at the present time are not in general susceptible to ready expansion should new transmitters or receivers need to be added to the network.

BRIEF SUMMARY OF THE INVENTION

It is an object of the present invention to provide an optical interconnection network which largely overcomes these disadvantages. According to the present invention an optical interconnection network comprises an optical signal bus and at least one module optical waveguide; the network being characterised in that the optical bus comprises a plurality of signal optical waveguides the optical signal bus and module being provided with co-operable coupling means for releasably coupling each module to the optical signal bus such that there is evanescent coupling between a module optical waveguide and a signal optical waveguide of the optical signal bus the network.

The modules provide optical coupling to or from the optical bus waveguide as required. An optical interconnection network according to the present invention can be readily extended by locating additional modules such that they are coupled to the optical bus.

A method of using an interconnection network according to the present invention comprises transmitting from at least one optical module signals which form a hierarchy of at least two independent multiplexing methods. For example, the transmitters can combine wavelength and time division multiplexing each being transmitter channel being identified by a unique combination of channels from the sets of available wavelength and time division channels. A receiver module can select the required transmitter signal by demultiplexing the hierarchy of multiplexes accordingly. Other combinations of multiplexing methods, and hierarchies greater than two may be employed.

Spatial multiplexing is readily included by providing the signal optical bus with additional waveguides, the receiver modules being provided with means for selecting a multiplex from the appropriate waveguide.

The allocation of the channels of the various multiplexes used in the hierarchy may be dedicated, i.e. fixed, for each modules, or assignable on a demand basis.

Preferably, the interconnection network will employ wavelength multiplexing as one of the hierarchy of multiplexes. This can be achieved by providing each transmitter module with a fixed or tunable source of optical radiation, for example a laser, or by providing a reference optical bus of at least two reference optical waveguides each couplable to an optical source of a distinct wavelength, each transmitter module being evanescently couplable to at least one of waveguides of the reference optical bus. The invention permits a hierarchy of wavelength, spatial and other multiplexing systems to be employed allowing a larger interconnect network to be formed than presently possible using any one of such multiplexing systems individually and the use of modules optically interfacing to the busses provides, in conjunction with the hierarchical multiplexing; a readily extendable network.

BRIEF DESCRIPTION OF THE DRAWINGS

Embodiments of the invention will now be described by way of example only with reference to the accompanying drawings in which.

DETAILED DESCRIPTION OF THE EXEMPLARY EMBODIMENTS

Figure 1:
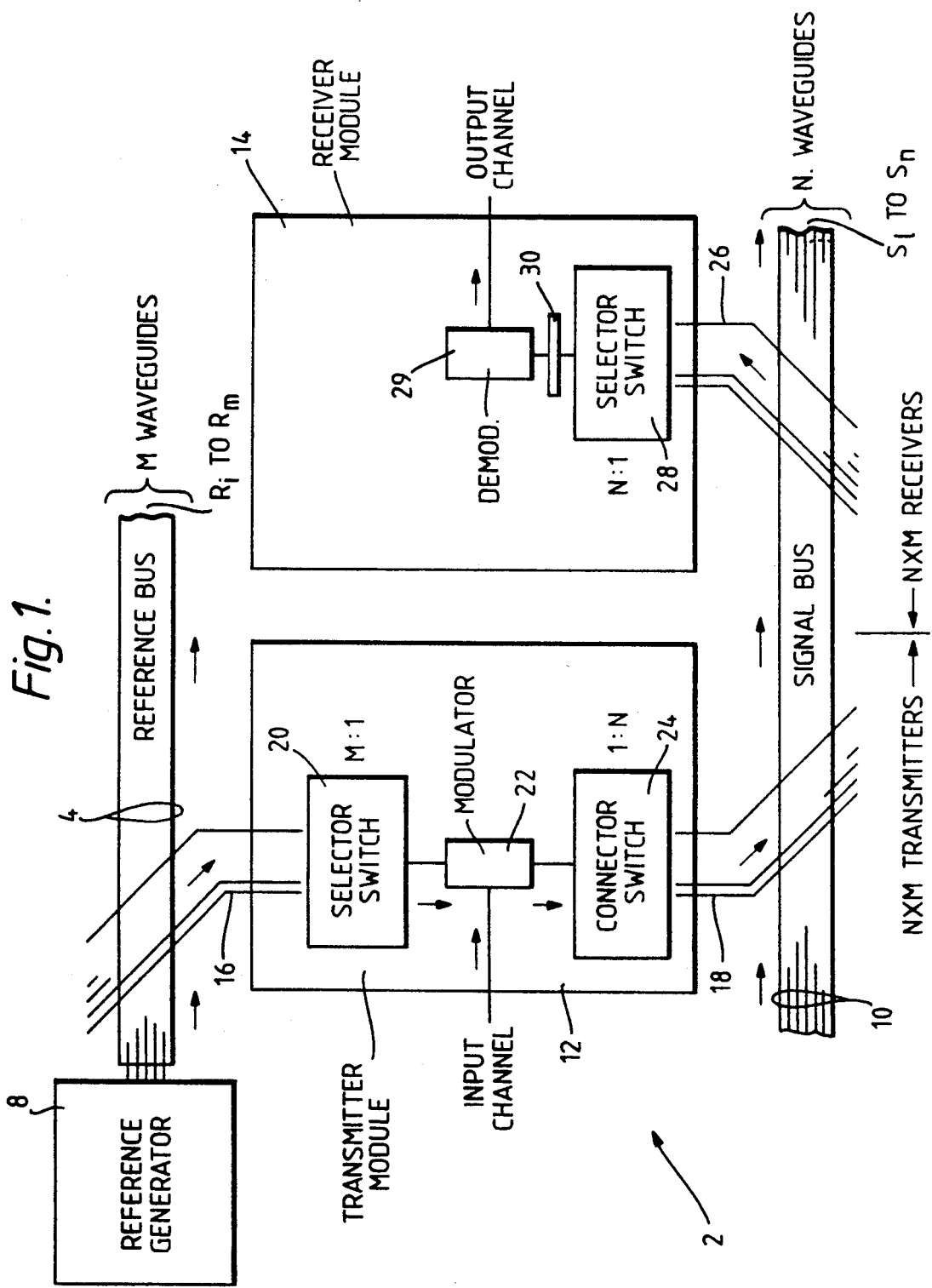
FIG. 1 is a schematic diagram of a network in which present invention can be incorporated.

Referring to FIG. 1 an interconnect network 2 has a reference bus 4 of m optical waveguides $R_i$ to $R_m$ each coupled to a respective optical source of distinct wavelength $\lambda_i$ to $\lambda_m$ shown collectively as a reference generator 8, and a signal bus 10 of N optical waveguides $S_1$ to $S_N$. For clarity there is shown only one transmitter module $T_i$ of upto $N \times M$ possible transmitter modules and one receiver module 14 of up to $N \times M$ possible receiver modules connectable to the network of this particular embodiment.

The transmitter module 12 in this example when fixed in position relative to the busses 4 and 10 has a first and second group of waveguides 16 and 18 evanescently coupled to the waveguides of the busses 4 and 10 respectively. Each waveguide of the group of waveguides 16 is coupled to one of the waveguides $R_i$ and in turn is optically coupled to a reference selector switch 20 which is arranged to couple one of the waveguides $R_i$ to an optical modulator 22. The modulator 22 modulates the carrier signal $\lambda_i$ coupled from waveguide $R_i$ with the information signal to be transmitted. The output of the modulator 22 is couplable via a connector switch 24 to a selected one waveguide of the group of waveguides 18 and hence to a selected one of the waveguides $S_i$.

The receiver module 14 includes a group of waveguides 26 and an N to 1 selector switch 28 which in the same manner as the selector switch 16 and waveguides 16 of the transmitter module 12 can selectively couple one of the signal waveguides $S_i$ to a demodulator 29 via a frequency selective optical filter 30.

An example of a means for coupling the waveguides of the busses 4 and 10 to the module waveguides of groups 16, 18 and 26 in accordance with the present invention will be described in detail below.

The principle behind the bus architecture is that the signal bus forms a message bearer bus carrying optical signals from the transmitter modules in a manner that is accessible to the receiver modules and that the reference bus provides a range of optical frequencies of carrier signal which can be selected by a given transmitter module 12. An interconnection path is established by selecting one wavelength of carrier signal by means of the selector switch 20 modulating the carrier so obtained by the message information and then connecting the modulated carrier via the connector switch 24 to the selected signal waveguide $S_i$.

Each waveguide $S_i$ can therefore carry a wavelength multiplex of M wavelengths, each transmitter being associated with a unique combination of wavelength $\lambda_i$ and waveguide $S_j$.

A receiver can select the information signal to be received by connecting the appropriate waveguide $S_j$ via the signal selector switch 28 and passing only the required wavelength $\lambda_i$ to the demodulator by means of the frequency selective filter 30.

The principle of using a hierarchy of multiplexing techniques can be extended by, for example, using time coding of transmission, coding of transmissions and so. Thus, for example a three layer hierarchy of space, frequency (as exemplified by the FIG. 1 arrangement) together with time domain multiplexing of the information signals to the modulators 22, each with a dimension of 100 channels would provide an interconnect power of $10^6$. This multiplication of the multiplexing power of each multiplexing technique therefore allows a much greater interconnect power than available from any one technique alone.

The ability to removably couple transmitter and receiver modules onto the basses 4 and 10 permits ready growth of the network by the addition of modules until all the multiplex combinations are used whereupon one additional muitiplex may be added to the hierarchy to further increase the interconnect power of the network and for transmitter and receiver modules to be unslugged and moved to different locations on the optical bus as necessary. Thus, for example, once $N \times M$ transmitters and receivers had been connected to the network, the introduction of P time slot channels would allow expansion of the network to $N \times M \times P$ transmitters and receivers.

The transmitter modules 12 and 14 can independently, be installed with dedicated channels, i.e. the selection and connector means coupling the modulator/demodulators to a single predetermined waveguide of each bus, in which case the groups of waveguides 16, 18 and 26 need comprise only one waveguide without a requirement for selector or connector switches, or they may be as shown in FIG. 1 which allows the transmitters and receivers to select the wavelength and space channel combination for transmission and reception.

Alternatively, the transmitter modules may be provided with fixed or tunable optical sources, for example lasers, which eliminates the need for the reference bus 4. If two or more non-spatial hierarchies are employed then the signal bus need have only one waveguide, each transmitter and receiver module being evanescently coupled to it exclusively. In the case of spatial multiplexing, i.e. two or more waveguides in the signal optical bus, the modules can, analogously to the wavelength multiplexing example above, be dedicated or assignable. If the modules are dedicated then the signal connector or signal selector switch may be eliminated, the optical waveguide of the modules being located so that it couples to the required waveguide of the signal optical bus when co-located with the bus.

Figure 2:
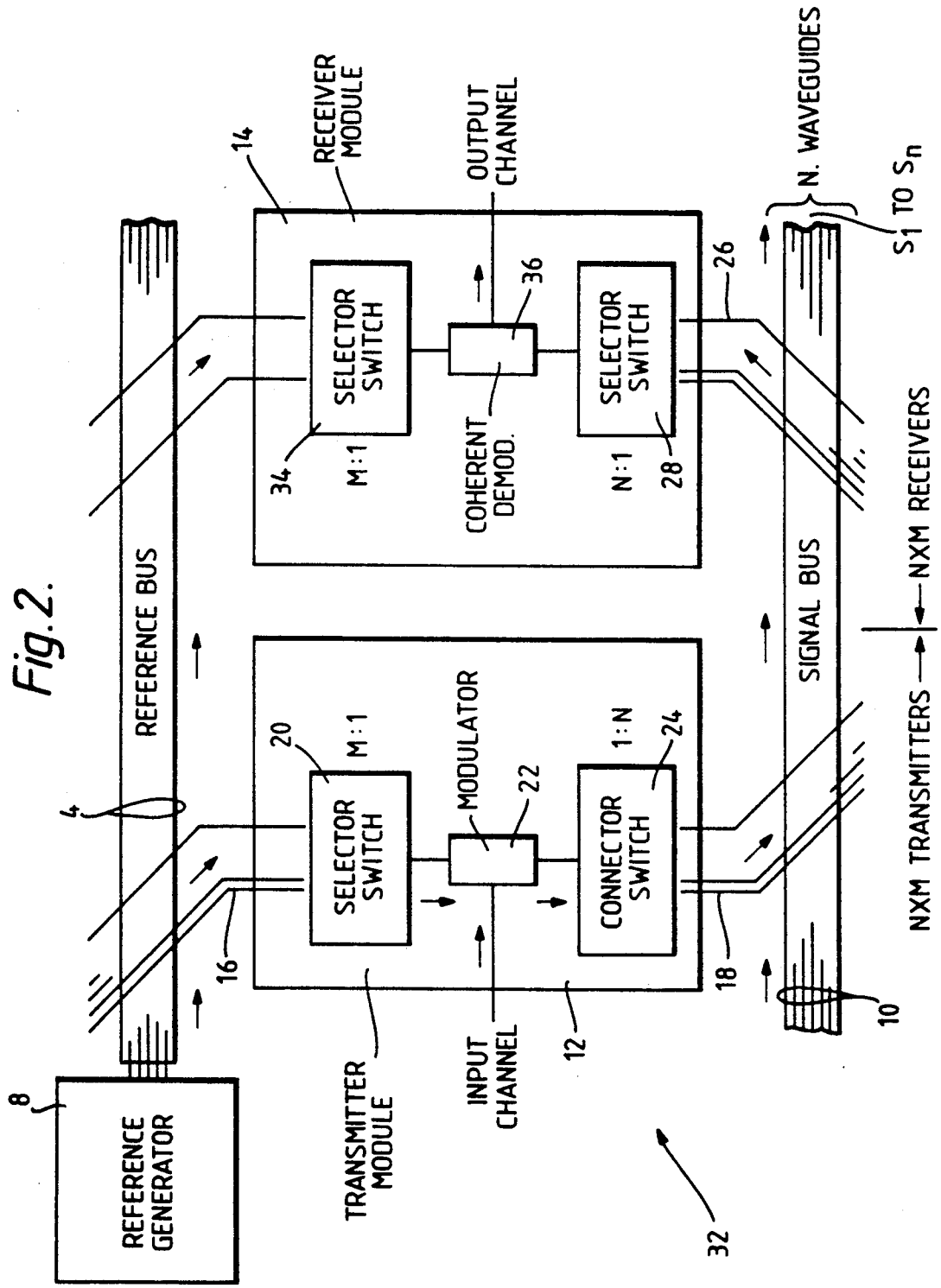
FIG. 2 is a schematic diagram of a second network in which the present invention can be incorporated in which the receiver modules employ coherent homodyne optical demodulator.

Referring now to FIG. 2, an interconnection network 31 is shown which is as the network 2 except that the wavelength selection in the receiver module 14 is not by way of a tunable filter 30 but by means of coherent, homodyne detection. This is achieved by means of an additional selector switch 34 which selectively couples one of the reference waveguides $R_i$ to the coherent demodulator 36 corresponding to the wavelength channel to be demultiplexed.

Figure 3:
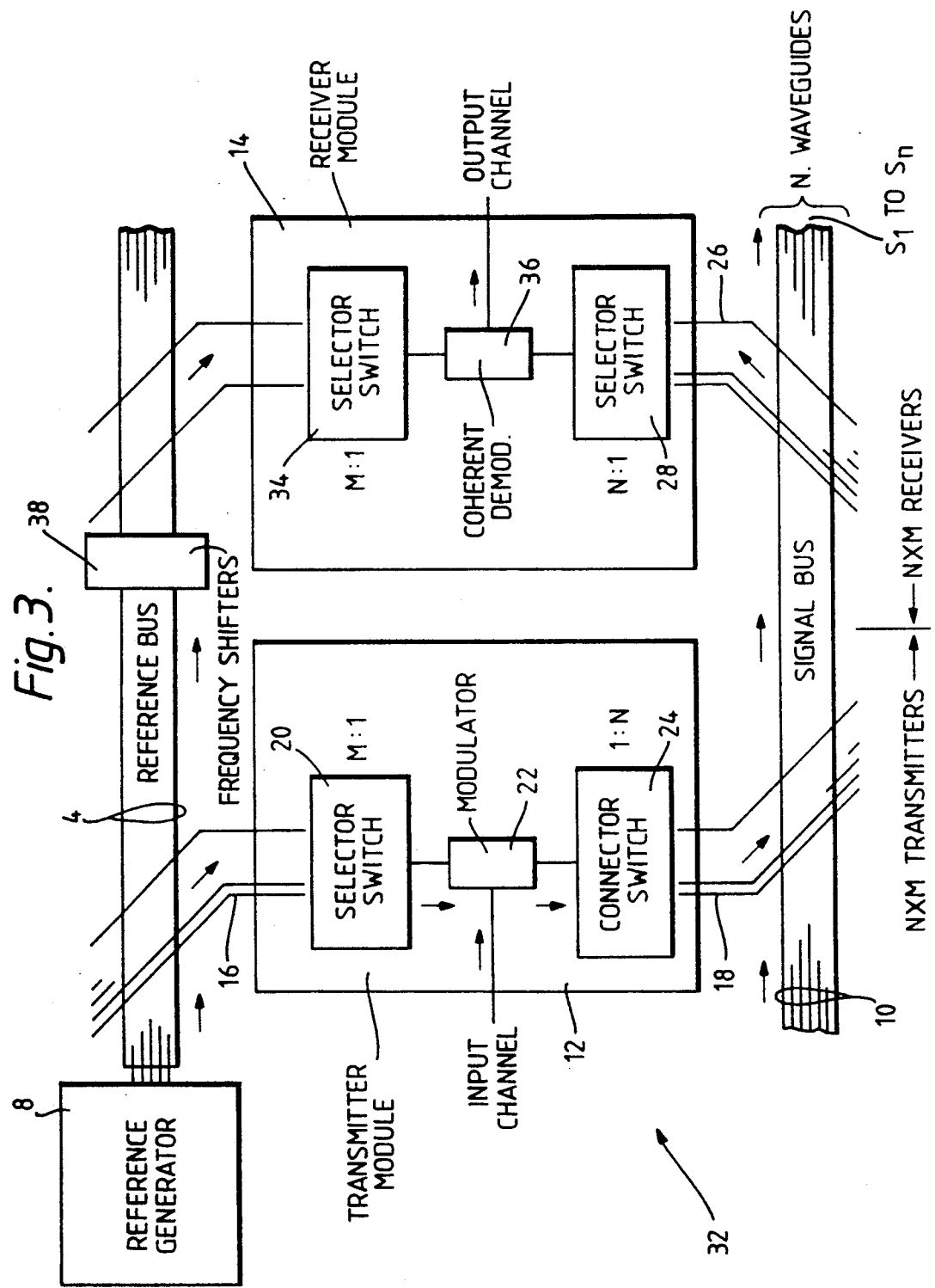
FIG. 3 is a schematic diagram of a third network in which present invention can be incorporated in which the receiver modules employ coherent heterodyne optical demodulators.

Heterodyne detection can be achieved in a similar manner as by the incorporation of frequency shifters 38 between the reference generator and the receiver modules 14 of the network of FIG. 2 as shown in FIG. 3.

Figure 4:
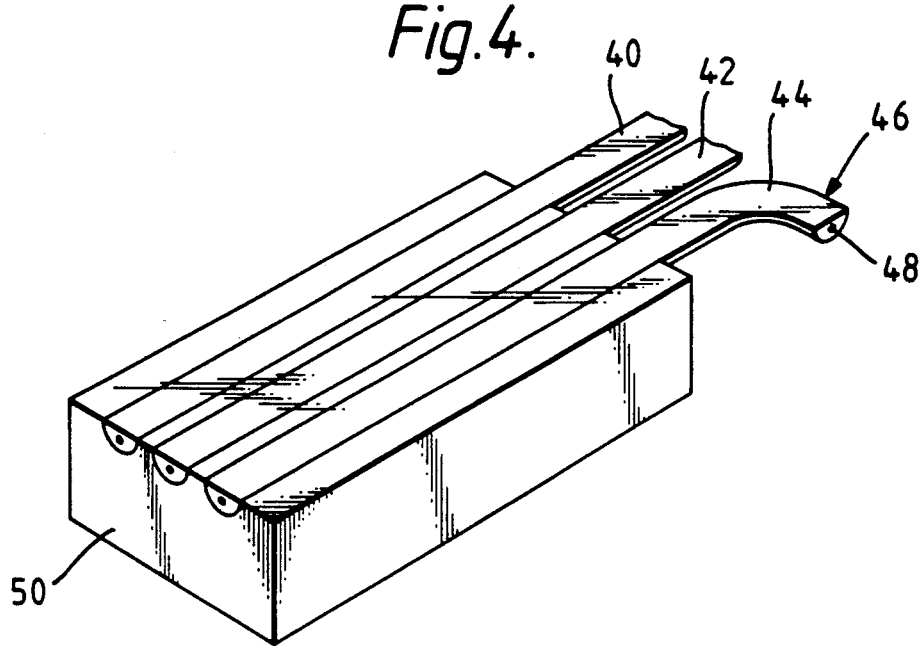
FIG. 4 is a perspective schematic view of an optical bus and a module according to the present invention.

A possible structure of the busses 4, 10, of the groups of waveguides 16, 18, 26 and a the method of inter-coupling them will now be described with reference to FIGS. 4 and 5. The busses were fabricated using optical fibres having a D-shaped cross-section, "D-fibres". This fibre is formed by cutting away one side of a preform of a normal optical fibre so that one side is close to the core. When drawn this produces a long, continuous length of fibre with a lateral flat surface 46 close to core 48 (as shown on FIG. 4 with respect to only one of the fibres 40, 42 and 44). In this particular embodiment the core was about 0.5 $\mu$m from the flat surface.

The three D-fibres 40, 42 and 44 were placed with their centres 250 $\mu$m apart and press-moulded into a polymer substrate that is of length 30 mm. The moulding was performed against a heated optical flat which ensured that the flat surfaces of the D-fibres align accurately in a common plane. The fibres 40, 42 and 44 where then cleaved and fusion spliced to standard single mode optical fibre in turn spliced to the tails of semiconductor lasers of wavelength 1.3 $\mu$m (not shown). A second substrate was fabricated (not shown), the D-fibres being spliced at one end of single mode tails to couple them to optical power meters.

Two of the waveguides in substrate 50 coupled to the lasers (not shown) performed the function of the optical bus 4 carrying the power. The third acted as a single signal bus waveguide but was coupled to a laser also to measure the coupling performance. A second substrate, acting as one of the module couplers, was positioned so it overlapped the first by 0.5 mm. The close proximity of the cores provided evanescent coupling between them allowing a small fraction of the optical power to be tapped out of the fibre bus into the corresponding waveguide of the second substrate.

A photomicrograph of the substrate 50 showed that the D-fibres appear as ridges 0.5 $\mu$m high and 85 $\mu$m wide, the remainder of the fibre diameter being concealed by copolymer 'ears' which grip the fibres and slope away to the general substrate level. The top points of the flat surfaces of the fibre occupy a plane to well within an accuracy of 100 nm with a spacing of 250 $\mu$m $\pm$ 20 $\mu$m.

The power splitting ratios between fibres are displayed in the table below, where the primed numerals indicate the equivalent fibres on the second substrate.

| fibre | 40 | 42 | 44 |
| --- | --- | --- | --- |
| 40' | −37dB | <−78dB | <−78dB |
| 42' | <−78dB | −39dB | <−78dB |

| -continued |
| fibre | 40 | 42 | 44 |
|---|---|---|---|
| 44' | <−78dB | <−78dB | −35dB |

The cross talk between unwanted pairs of fibres was below the measurement limit of −78 dB. The ratio of wanted to unwanted signal was therefore at least 43 dB at each tapping point.

A detained treatment of the tolerancing of the bus and connector substrates shows that with the present design, a lateral and angular misalignment 250 μm, and 1° respectively, a fibre height variation of 0.75 μm, or a wavelength chance from 1.3 to 1.5 μm, each give smaller variation in output power than 3 dB. All these parameters are well within achievable engineering limits and, have been achieved here. A more critical parameter is the "rocking" of the connector in the two available dimensions. However, by taking advantage of the close tolerance of the planes formed by the D-fibre flats (<100 nm), the natural contact of these planes as the connector contacts the bus is well within the tolerance needed. It is obvious that the position of contact along the bus will be immaterial. Many connectors could therefore be connected to the bus along its length.

Each connector substrate in principle only takes up a few mm of space on the D-fibre bus. The optical loss of D-fibre is below 1 dB/m. It can therefore be envisaged that by expanding the present geometries and maintaining the physical tolerances already achieved an optical distribution bus capable of interconnecting large numbers of communicating terminals could be built using present optical technologies.

Figure 5:
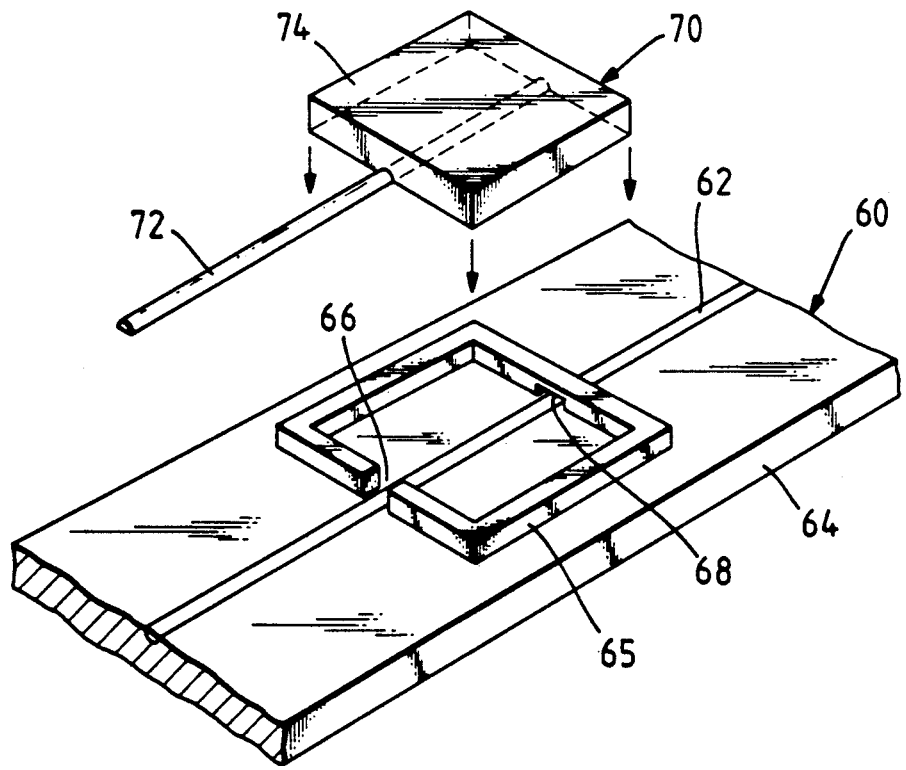
FIG. 5 is an optical interconnection network showing a portion of an optical fibre bus 60 having one signal optical D-fibre 62.

Referring now to FIG. 5 an optical interconnection network shows a portion an optical fibre bus 60 having one signal optical D-fibre 62 embedded in a thermoplastic substrate 64. A portion of the fibre 62 lies within a wall structure 65 having a slot 66 and a channel 68 to avoid contact with the flat of the D-fibre 62.

A module 70 comprising an optical D-fibre 72 embedded in a thermoplastic substrate 74 is dimensioned to be a push fit in the wall structure 66. When pushed into structure 68 the fibres 72 and 62 are held in position to permit evanescent coupling. The fibre 72 extends through the slot 66 to a receiver or transmitter as required.

The module 70 may be provided with a handle to ease removal of the module 70 from the wall structure 64.

We claim:

1. An optical interconnection network comprising:
    an optical signal bus having a first substrate supporting a plurality of optical waveguides, the waveguides each having a flat surface substantially co-planar with a surface of the substrate,
    at least one connector module for connection to the bus, the module comprising a second substrate supporting at least one optical waveguide having a flat surface substantially co-planar with a surface of the second substrate over the length of the module, and
    means for releasably coupling the module to the signal bus in a face-to-face relationship such that an evanescent coupling is formed between a waveguide of the module and a waveguide of the bus.

2. A network according to claim 1 in which the releasable coupling means includes upstanding guide walls on one of the substrates adapted to locate respective side edges of the other substrate such that the respective waveguides of the two substrates are aligned relative to one another over the length of the module.

3. A network according to claim 2 in which said guide walls include a first pair of opposed walls extending generally parallel to the direction of the waveguides in the respective substrates, and a second pair of opposed walls transverse to the first pair.

4. A network according to claim 2 or 3 in which the guide walls include aligned openings forming a passage for the respective optical waveguides in the two substrates when the module is coupled to the bus.

5. A network according to claim 3 in which the guide walls define a socket and in which the connect module is a push-fit in the socket.

6. A network according to claim 1 in which the releasable coupling is a plug-in coupling.

7. A network according to claim 1 or 2 in which the waveguides comprise D-fibres.

8. A network as in claim 1 or 2 in which the module has a plurality of waveguides, one positioned to couple to each of the waveguides in the signal bus.

9. A network according to claim 8 further comprising:
    an optical signal transmitting means; and
    first transmitter selection means whereby the transmitting means is couplable to a selected one of the signal waveguides.

10. A network as in claim 9 in which the optical signal transmitting means comprises a tunable laser.

11. A network as in claim 8 further comprising a receiving means, the module being provided with a first receiver selection means whereby the receiving means is couplable to a selected one of the signal waveguides.

12. A network as in claim 11 in which the receiving means comprises a tunable optical filter.

13. A network as in claim 9 further comprising a reference optical bus which includes two or more reference optical waveguides each coupled to an optical source of a distinct wavelength, and in which the module has a module waveguide positioned to couple to a predetermined one of the reference waveguides and means for modulating an optical signal coupled from said reference waveguides.

14. A network as in claim 13 in which the module has a plurality of module waveguides positioned to couple to each of the reference waveguides, and second transmitter selection means whereby the transmitting means is couplable to a selected one of the reference waveguides.

15. A network as in claim 11 further comprising a reference optical bus which includes two or more reference optical waveguides each coupled to an optical source of a distinct wavelength, and in which the receiving means comprises a coherent demodulator, and the module has a module waveguide positioned to couple to a predetermined one of the reference waveguides whereby the coherent demodulator is couplable to one of the optical sources.

16. A network as in claim 15 in which the module has a plurality of module waveguides positioned to couple to each of the reference waveguides and a second receiver selection means whereby the receiving means is couplable to a selected one of the reference waveguides.

17. A method of optical interconnection comprising:
    providing an optical signal bus having a first substrate supporting a plurality of optical waveguides, the waveguides each having a flat surface substantially co-planar with a surface of the substrate, providing at least one connector module for connection to the bus, the module comprising a second substrate supporting at least one optical waveguide having a flat surface substantially co-planar with a surface of the second substrate over the length of the module, and releasably coupling the module to the signal bus in a face-to-face relationship such that an evanescent coupling is formed between a waveguide of the module and a waveguide of the bus.

18. A method according to claim 17 in which the releasable coupling means includes upstanding guide walls on one of the substrates adapted to locate respective side edges of the other substrate such that the respective waveguides of the two substrates are aligned relative to one another over the length of the module.

19. A method according to claim 17 in which said guide walls include a first pair of opposed walls extending generally parallel to the direction of the waveguides in the respective substrates, and a second pair of opposed walls transverse to the first pair.

20. A method of using a network as claimed in claim 17, 18 or 19 wherein the plurality of waveguides on the signal bus provide a first plurality of spatially multiplexed signal channels, and wherein additional channels are provided by independently multiplexing signals transmitted along each said spatially multiplexed channel.

21. A method as in claim 20 in which the independent multiplexing comprises wavelength multiplexing.

22. A method as in claim 20 in which the independent multiplexing comprises time division multiplexing.

* * * * *